United States Patent [19]

Rogier

[11] Patent Number: 4,562,903

[45] Date of Patent: Jan. 7, 1986

[54] WHEEL HUB WITH INTEGRAL BRAKE AND REDUCER

[75] Inventor: Léonce Rogier, Saint Denis, France

[73] Assignees: So.M.A. Europe Transmissions; Societe Nouvelle Mecanique Et Automobile, both of Saint Etienne, France

[21] Appl. No.: 547,844

[22] Filed: Nov. 2, 1983

[30] Foreign Application Priority Data

Nov. 3, 1982 [FR] France ................................ 82 18404

[51] Int. Cl.$^4$ .......................... B60T 1/06; F16D 55/36
[52] U.S. Cl. .................................... 188/18 A; 74/801; 188/71.5; 301/108 S
[58] Field of Search ..................... 188/71.5, 72.3, 72.4, 188/18 A, 218 XL, 73.32, 361, 369, 264 AA, 264 D, 71.1, 72.6, 106 F, 106 A; 301/6 W, 6 CS, 108 S, 108 SC; 74/411.5, 801; 192/4 A, 70.13, DIG. 1, 70.21

[56] References Cited

U.S. PATENT DOCUMENTS

| | | | |
|---|---|---|---|
| 2,953,040 | 9/1960 | Christenson et al. | ............. 74/801 X |
| 2,974,753 | 3/1961 | Allin, Sr. et al. | ............... 188/71.5 X |
| 3,088,552 | 5/1963 | Christenson et al. | ....... 188/106 F X |
| 4,037,694 | 7/1977 | Keese | ................... 192/4 A |
| 4,275,616 | 6/1981 | Ehrlinger et al. | ................ 74/801 X |

FOREIGN PATENT DOCUMENTS

| | | |
|---|---|---|
| 1106612 | 5/1961 | Fed. Rep. of Germany . |
| 2154474 | 5/1972 | Fed. Rep. of Germany . |
| 2392279 | 12/1978 | France . |
| 2479746 | 10/1981 | France . |
| 2517003 | 5/1983 | France . |
| 0520430 | 3/1955 | Italy ................................ 188/71.5 |
| WO80/02821 | 12/1980 | PCT Int'l Appl. . |
| WO81/03469 | 12/1981 | PCT Int'l Appl. . |
| 1594972 | 8/1981 | United Kingdom . |
| 2073115 | 10/1981 | United Kingdom . |

Primary Examiner—Douglas C. Butler
Assistant Examiner—Robert J. Oberleitner
Attorney, Agent, or Firm—Charles E. Brown; Charles A. Brown

[57] ABSTRACT

The invention is applicable to a wheel hub of the kind comprising within a hollow body closed by a cover, a reducer having a pinion-carrier, and a brake with a brake disc capable of being subjected to an axial clamping force which is counter-supported by the cover. According to the invention, the pinion-carrier forms a part which is separate both from the hollow body and from the cover and which bears axially on an abutment itself locked axially on the hollow body, thereby itself closing the hollow body transversely immediately before the cover. The result is that in order to unclamp the brake manually, it is simply necessary to act on the cover. The invention is applicable, in particular, to industrial vehicles, agricultural machines, public works machines and load-handling machines.

14 Claims, 4 Drawing Figures

WHEEL HUB WITH INTEGRAL BRAKE AND REDUCER

BACKGROUND OF THE INVENTION

The present invention relates generally to a wheel hub with an integral brake and reducer, of the kind employed, for example, in industrial vehicles, agricultural machines, public works machines, or load-handling machines such as cranes or bridge-layers.

In general, such a wheel hub comprises a hollow body which, internally, is mounted to rotate on a fixed support sleeve, generally called a stub, and on the outside of which cab be attached, by its lateral extension, the wheel in question, and, in the said hollow body, in order to reduce its speed of rotation in use to a permissible value, a wheel reducer whose pinion-carrier is locked on the hollow body while the pinion shaft is intended to be locked on a wheel shaft mounted to rotate in the stub, and, in addition, for braking the whole unit when required, a brake comprising at least one brake disc which, being itself also intended to be locked in rotation to the said wheel shaft, either directly or indirectly, is capable of being subjected to an axial clamping force under the control of a suitable control unit, most frequently through the intermediary of a pressure plate.

When, as is most frequently the case, the hollow body is tubular overall, being closed transversely at the side opposite the stub by a removable cover which bears axially on it and which, in practice, is attached to it by screws engaged in the thickness of its section, the pinion-carrier is most frequently formed directly by such a cover, and is an integral part of the latter.

This is the case, for example, in the construction described in French Patent Application filed on Apr. 3, 1981 under No. 81/06,903 and published under No. 2,479,746.

This is also the case in the construction described in International Patent Application filed on May 28, 1980 under No. PCT/US80/00,644. and published under No. WO 81/03,469.

In French Patent Application filed on Nov. 23, 1981 under No. 81/21,885, however, the pinion-carrier consists of a part which is separate from the cover. In fact, this French Patent Application relates to an arrangement according to which the brake is arranged on the end of the wheel hub in question, that is to say beyond this wheel hub relative to the axle on the end of which the latter is itself to be fitted.

Consequently, to form a corresponding compartment for the brake, the hollow body of the hub is extended by a crown, and the latter is closed transversely by a removable cover at its opposite end, whilst the said hollow body is itself formed of two shells which are suitably coupled face-to-face, whilst the pinion-carrier forms an integral part of that shell which is axially the furthest from the stub. Thus, in such a design, the pinion-carrier is a direct part of the hollow body.

Most frequently, in the wheel hubs with an integral brake and reducer of the kind in question, the control of the brake incorporated in the wheel hub is two-fold; to form a service brake, there is first of all a hydraulic control which, to be brought into action, must be connected to a source of fluid under pressure; to form a brake for emergency or for parking, there is then a mechanical control which, in contrast to the preceding, is prevented from intervening when it is connected to a source of fluid under pressure, which is different in practice from the aforesaid source, and which, under the stress of an elastic control device, for example a stack of Belleville washers, is brought into action only if its connection to this source of pressure is interrupted.

This is the case, for example, in International Patent Application No. 80/00,644 and in French Patent Application No. 81/21,885, referred to earlier.

In practice, in both cases, the control unit controlling the brake is arranged on that side of the brake disc which is opposite the cover, so that when this brake disc is clamped axially, it is this cover which, directly or indirectly, provides an axial support for the latter.

One of the problems to be solved in the production of wheel hubs with an integral brake and reducer is to permit a simplified release of the brake fitted to the wheel hub, and preferably, in practice, a manual release for this brake when, the latter having served as an emergency brake, its intervention is due to some defect.

With the wheel hub described in International Patent Application No. 80/00,644, referred to above, such a release requires not only the complete opening of the hollow body of the hub, with the complication that this implies, but also the removal of the wheel in question, which prevents the vehicle in question from being itself able then possibly to continue its course at a low speed towards a workshop which is more specialized in dealing with the defect which has caused the locking of the emergency brake in question.

In fact, in this International Patent Application No. 80/00,644, the screws ensuring the fixing of the cover to the hollow body also ensure the fixing to the latter of the lateral extension of the wheel in question.

The repair must therefore be carried out on site.

This is also the case, in practice, for the locking of the brake of the wheel hub described in French Application No. 81/06,903, referred to above, although in the latter, and similarly in French Application No. 81/21,885, also mentioned above, the hollow body has, for fixing the lateral extension of the wheel, a special shoulder forming a flange which is separate from the cover, and which extends to a circumference of a diameter which is greater than that of the circumference to which the latter extends, with the result that the withdrawal of this cover can normally be carried out independently of any untimely removal of such a wheel.

However, in this French Patent Application No. 81/06,903, with the cover itself forming the pinion-carrier, any withdrawal of this cover is excessively complicated.

This is not exactly the case in French Patent Application No. 81/21,885, in which, being arranged at a distance from the pinion-carrier and forming a part which is separate from the latter, the cover merely closes the compartment, or brake compartment, in which the brake is fitted.

However, even partial withdrawal of the cover is still undesirable in such a case to avoid any contamination, possibly by dust or other dirt, of the interior of the brake compartment.

This is why, for unlocking the brake manually, there are provided, in this French Patent Application No. 81/21,885, special screws which are engaged by screwing in tapped openings in the cover and are capable, by screwing, of pressing back the pressure plate, ensuring the axial clamping of the brake disc or discs comprised in this brake.

Although such an arrangement is satisfactory, it has the disadvantage of requiring the use of special parts, namely the screws in question.

The general object of the present invention, is an arrangement of this kind which permits easy manual release of the brake, if necessary without any special part being provided for this purpose.

SUMMARY

More preciesly, the invention provides a wheel hub with an integral brake and reducer, of the kind comprising an overall tubular hollow body which, internally, is mounted to rotate on a fixed support sleeve, generally called a stub, which is closed transversely by a removable cover on the side opposite the said stub, and which, externally, along a circumference of a diameter which is greater than that of the circumference along which extends the periphery of the said cover, has a transverse shoulder to which a wheel can be attached by its lateral extension, and, in the said hollow body, on the one hand a brake comprising at least one brake disc, which is intended to be locked in rotation to a wheel shaft mounted to rotate in the stub and which is capable of being subjected to an axial clamping force under the control of a control unit arranged on the side of the brake disc opposite the cover, with the result that, when the brake disc is axially, clamped, the said cover is capable of providing, directly or indirectly, an axial support to the latter, and, on the other hand, a wheel reducer whose pinion-carrier is locked on the hollow body, this wheel hub being characterised in that the pinion-carrier of the wheel reducer forms a part which is separate both from the hollow body and from the cover closing the latter, the said pinion-carrier bearing axially on abutment means which is itself locked axially on the said hollow body and thereby itself closing the latter transversely immediately before the said cover.

According to a first embodiment, in which on the side of the brake disc opposite the control unit, there is a bearing plate associated with the said brake disc, reckoning from this bearing plate there extend axially, in the direction of the cover, small columns, called here for convenience small transmission columns, which, after passing through the pinion-carrier, are capable of bearing axially on the cover.

For example, the latter being attached to the pinion-carrier by axial ties, the said small transmission columns bear directly on the cover with the result that to unclamp the brake disc manually, it is sufficient to act on the said axial ties. In such a case no special part need be provided for manually unclamping the brake disc.

However, if desired, the small transmission columns can, in an alternative form, each bear individually on special support screws engaged by screwing in tapped openings provided for this purpose in the cover. In such a case, to unclamp the brake disc manually, it is necessary to act on the said screws.

According to a second embodiment, in which, on the side of the brake disc opposite the control unit, there is a bearing plate associated as before with the said brake disc, and in which the said bearing plate bears axially on the pinion shaft of the wheel reducer, in combination, on the one hand the cover is attached to the pinion-carrier by axial ties and, on the other hand, the pinion shaft bears axially against the said cover, either directly or indirectly.

Thus, and as before, to unclamp the brake disc manually it suffices to unscrew the said axial ties. Also as before, no special part is required for such a manual unclamping of the brake disc.

In all cases, this manual unclamping can easily take place at the very site of the incident which has led to the locking of the brake disc, without special complications and/or untimely risk of contamination of all or part of the inner space of the hollow body of the wheel hub in question. The vehicle which is affected by this incident can, if necessary, itself proceed on its way, to be repaired more thoroughly in a specialised workshop.

DESCRIPTION OF THE PREFERRED EMBODIMENTS

Figure 1:
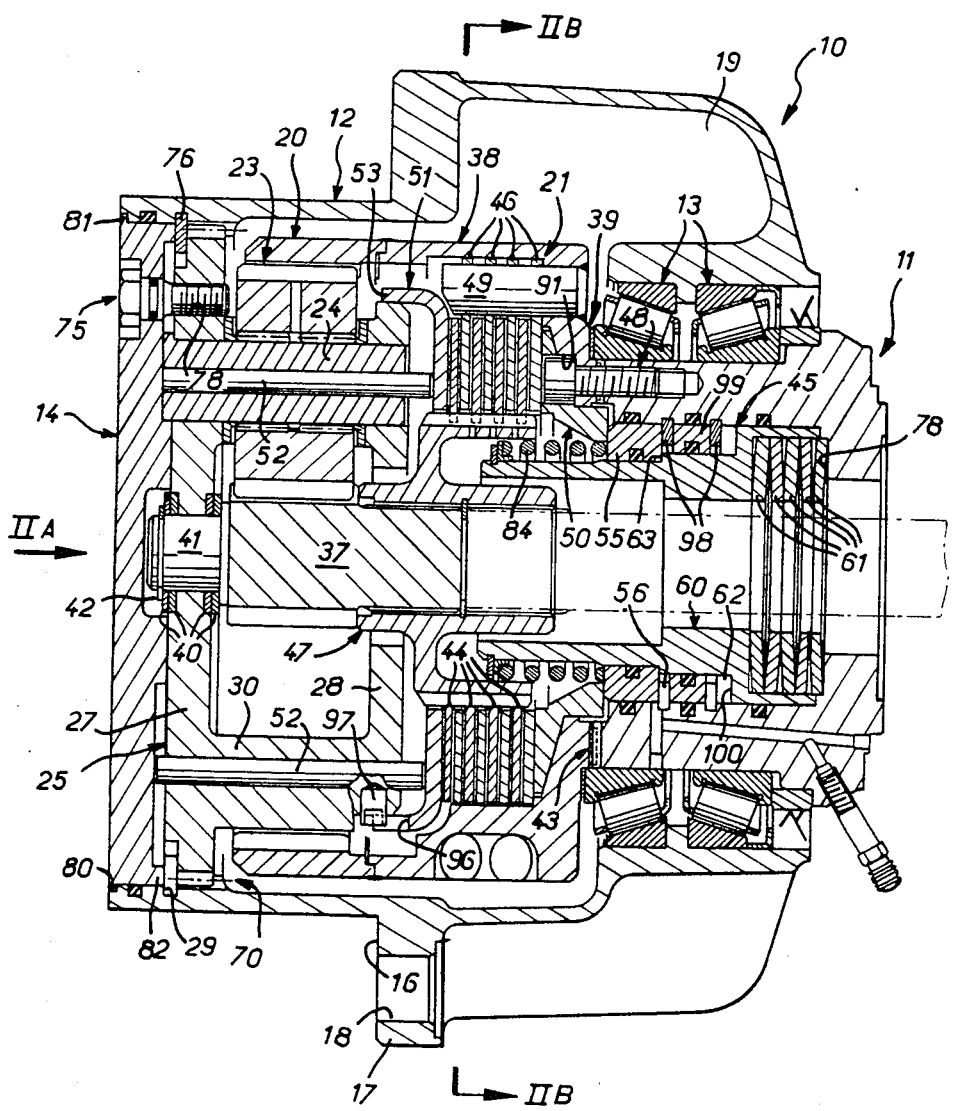
FIG. 1 is a view in axial cross-section along the broken line I—I of FIG. 2B, of a wheel hub with an integral brake and reducer according to the invention.

In a known manner, and as illustrated in these Figures, the wheel hub 10 according to the invention, which is in practice a hub of a driving wheel, is intended to be attached to a fixed support sleeve 11 generally called a stub, itself attached at the end of a rigid or steering axle, not shown. A wheel shaft, itself not numbered, would be mounted for rotation in the stub 11.

In a manner which is also known, the wheel hub 10 according to the invention comprises an overall tubular hollow body 12, which, internally, is mounted to rotate on the stub 11, with interposition of two bearings 13, and which, according to arrangements which are described in greater detail below, is closed transversely by a removable cover 14 on the side opposite the said stub 11.

Externally, and along a circumference of a diameter which is greater than that of the circumference along which extends the periphery of the cover 14, the hollow body 12 forms transversely an annular shoulder 16 on which the wheel in question can be attached by its lateral run-out or extension independently of the said cover 14.

The wheel has not been shown in the Figures.

In practice, the shoulder 16 belongs to a flange 17 which has, in places, passages 18 for the installation of suitable wheel studs, to fix the lateral run-out of the wheel in question.

Figures 2A, 2B:
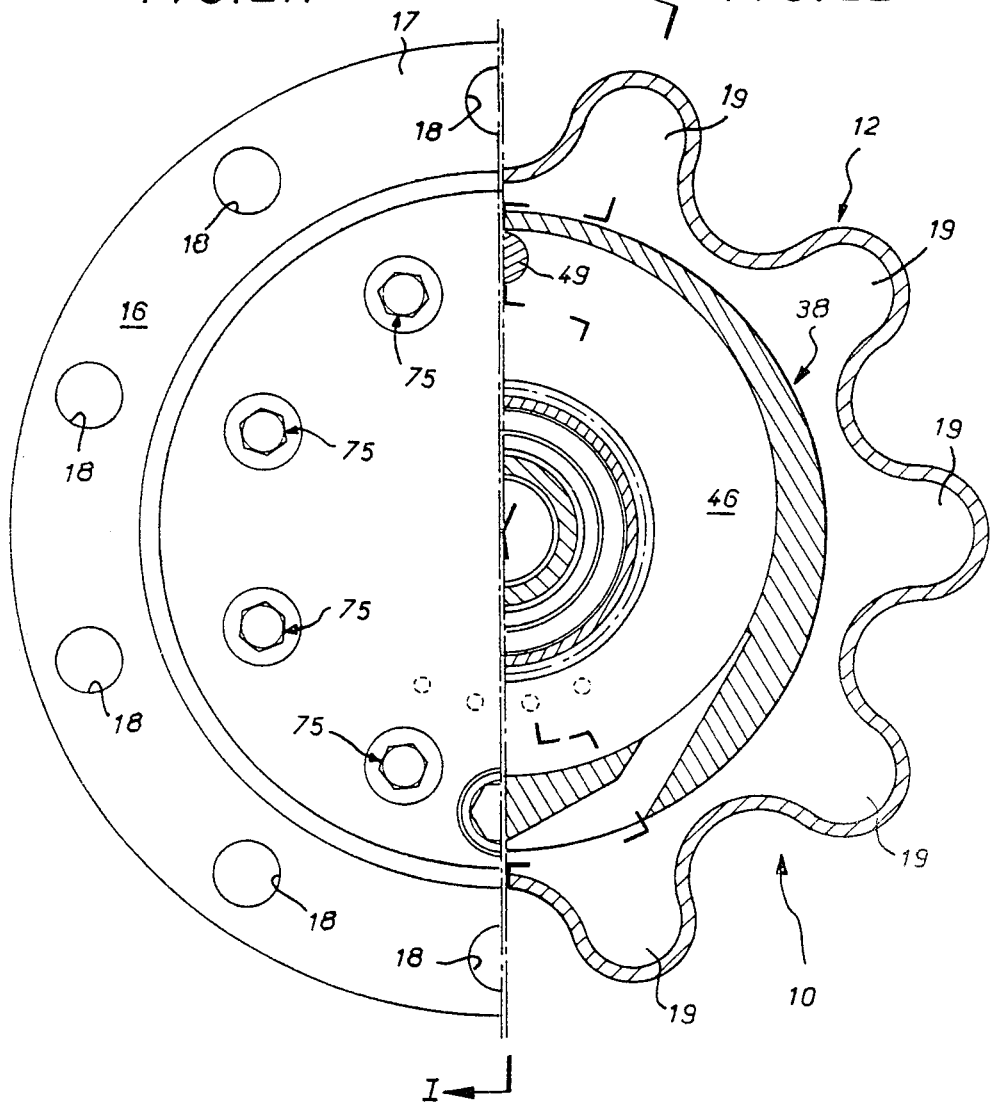
FIG. 2A is a half end view, along the arrow IIA of FIG. 1.
FIG. 2B is, in a complementary manner, a half view of it in axial cross-section, along the line IIB—IIB of this FIG. 1.

In the form of embodiment shown in FIGS. 1 and 2, the hollow body 12 is circularly wave-shaped on the side of the flange 17 opposite the cover 14, that is to say on the side of this flange 17 situated on the side of the stub 11, thereby forming radially, cavities 19 alternating with the passages 18. It forms a leakproof enclosure in which a certain quantity of oil is confined.

In this hollow body 12 are arranged, on the one hand, on the other side of the cover 14, a wheel reducer 20 and, on the other hand, on the side of the stub 11, a brake 21.

In known manner, the wheel reducer 20 comprises a plurality of planetary pinions 23 which, distributed uniformly in a circle around the axis of the assembly, are each individually mounted in rotation around support shafts 24, themselves carried by a pinion-carrier 25.

According to the invention, this pinion-carrier 25 forms a part which is separate both from the hollow body 12 and from the cover 14 which closes it, and, arranged to bear axially on abutment means 76, itself locked axially on the said hollow body 12, this pinion-carrier itself closes transversely this hollow body 12 immediately before the said cover 14.

In the form of embodiment shown, the abutment means 76 consists of an elastic split washer in engagement with a groove 29 provided for this purpose in the hollow body 12.

In practice, the pinion-carrier 25 comprises, transversely, two flanges 27, 28 the first in the immediate vicinity of the cover 14, the second at a distance from the latter, and between these flanges 27, 28 extend axially, on the one hand, the support shafts 24 of the planetary pinions 23, the said support shafts 24 being engaged by force in openings provided for this purpose in the said flanges 27, 28, and, on the other hand, arms 30 which, continuously with the flanges 27, 28, alternate in a circle with the support shafts 24.

In known manner, the pinion-carrier 25 thus formed is locked in rotation on the hollow body 12.

In the embodiment shown, and according to arrangements which, not forming part of the present invention, will not be described here in greater detail, a grooved fitting 70 is provided for this purpose between the peripheral section of the flange 27 of the pinion-carrier 25 and the inner surface of the hollow body 12.

The pinion-carrier 25 forms according to the invention, a part separate from the cover 14 and from the hollow body 12, and the said cover 14 is attached to it by axial ties 75. In the embodiment shown, these are screws which, arranged uniformly in a circle, pass in a leaktight manner through the cover 14 and are engaged by screwing in tapped openings 78 provided for this purpose in the transversal flange 27 of the pinion-carrier 25.

Cojointly, for the axial support of the cover 14 which is thus stressed by the axial ties 75 in the direction of the inner space of the hollow body 12, this hollow body 12 has, on the inner edge of its corresponding section, a step 80, and, correspondingly, the cover 14 has, projecting radially, a collar 81 which, complementing the said step 80, is capable of co-operating in abutment with the latter.

Preferably, and as shown in FIG. 1, the cover 14 has, in the direction of the elastic split washer forming the abutment means 76, an axial extension 82 going as far as the immediate vicinity of the washer, while providing, as a result of unavoidable fitting tolerances, some play with respect to it, which is not visible in the figures.

As can easily be understood, this axial extension 82 of the cover 14 is intended to restrict possible bending, towards the outside of the space of the hollow body 12 and under the stress of the axial ties 75, of the elastic split washer forming the abutment means 76.

Figure 3:
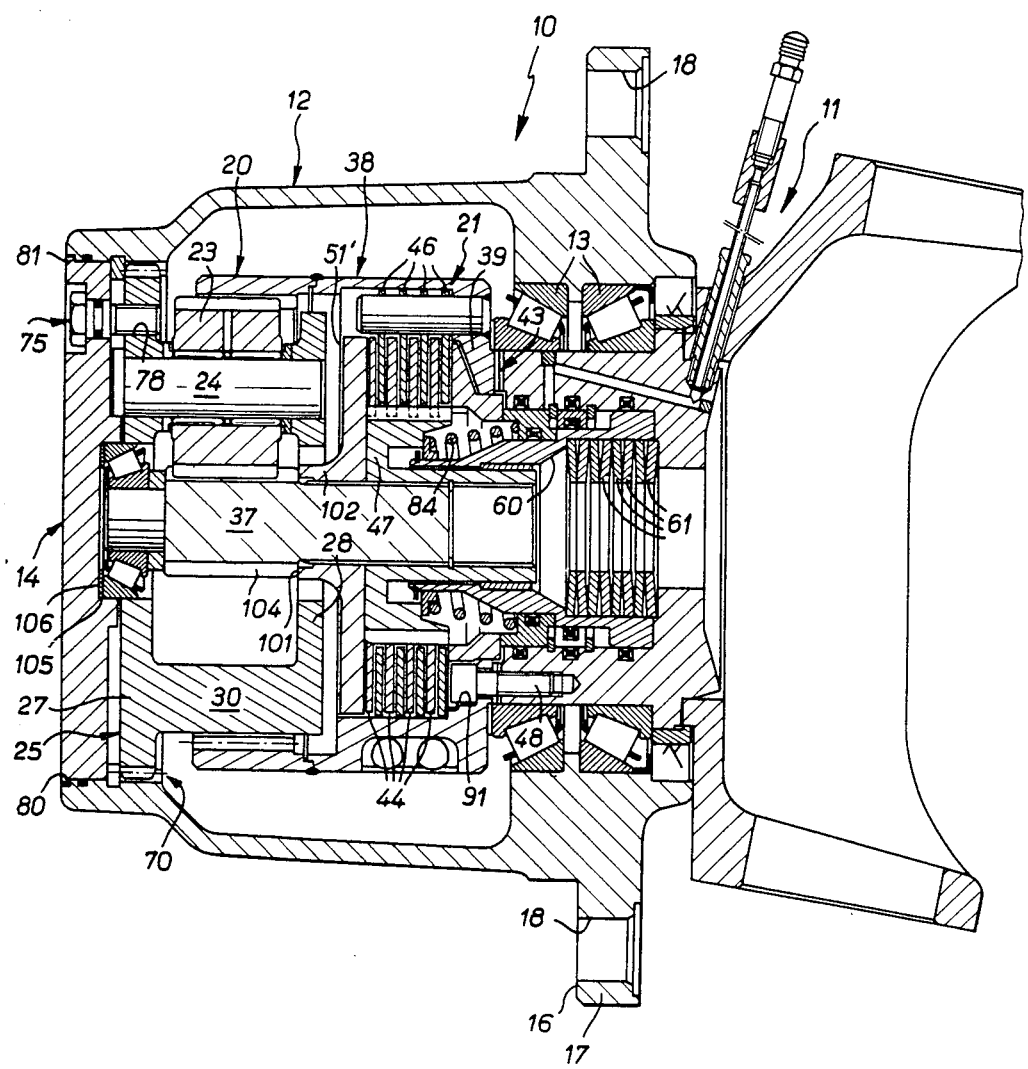
FIG. 3 is a view in axial cross-section analogous to that of FIG. 1, relating to an alternative embodiment.

In an alternative form, shown in FIG. 3, the cover 14 is itself extended axially for the same purpose as far as the immediate vicinity of the elastic split washer forming the abutment means 76.

In known manner, the planetary pinions 23 of the reducer 20 invervene between a pinion shaft 37, which is intended to be fixed solidly in rotation to the associated wheel shaft, and a crown or ring gear 38, which is fixed solidly to a transversal support flange 39, generally called a crown-carrier, itself locked on the stub 11.

In the embodiment shown more particularly in FIGS. 1 and 2, the pinion shaft 37 is locked axially on the transversal flange 27 of the pinion-carrier 25 through the intermediary of friction washers 40, the pinion shaft 37 passing for this purpose through the transversal flange 27 through an axial extension 41 which, at its end, carries an elastic split ring 42 to retain the whole assembly axially.

Furthermore, in this embodiment, the crown 38 is produced axially in two parts which are coupled suitably to each other, for example by welding, as shown, and, in between its crown-carrier 39 and the stub 11, there intervene, face to face, in combination, at the end of the said stub 11, on the one hand, means for positive locking 43, acting circumferentially, for the required locking in rotation, and, on the other hand, screws 48, acting axially, for the axial retention of the whole assembly.

In known manner, the brake 21 comprises at least one brake disc 44 which is intended to be locked in rotation on the wheel shaft and is capable of being subjected to an axial clamping force under the control of a control unit 45.

In practice, and as shown, there is provided a plurality of brake discs 44, or internal discs, alternating with the insert discs 46, and/or outer discs, and the assembly is arranged within the inner part of the space inside the crown 38 of the associated wheel reducer 20.

The brake discs 44 are locked in rotation on a carrier hub 47 itself locked in rotation by a grooved fitting on the pinion shaft 37 of the reducer 20.

According to the invention, this carrier hub 47 is capable, by means of a grooved fitting, of being locked in rotation on the wheel shaft, with the result that in itself it forms an intermediary between the pinion shaft 37 and the said wheel shaft, or, in other words, it is through its intermediacy that this pinion shaft 37 is locked on the latter.

According to the arrangements of the type of those described in French Patent Application No. 81/21,885 mentioned above, the insert discs 46 are engaged with a single small supporting column 49 which extends axially.

According to the invention this small supporting column 49 is fixed solidly to the crown 38 of the reducer 20. It is, in effect, carried by the crown-carrier 39 of the latter, projecting on this crown carrier 39 in the direction of the cover 14. This small supporting column 49 is thus fixed, and the same applies to the insert discs 46.

According to arrangements described in detail in French Patent Application No. 81/21,885, the insert discs 46 are pivotally mounted around their small supporting column 49, and their outer periphery is eccentric with respect to the axis of the assembly, to co-operate in abutment with the corresponding part of the inner wall of the crown 38, itself eccentric in a complementary manner.

Naturally, the brake discs 44 are mounted to move axially on their carrier hub 47 and, similarly, the insert discs 46 are mounted to move axially on their respective small supporting column 49.

In practice, the control unit 45 associated with them is arranged on the side of the stub 11, and hence on the side opposite the cover 14, with the result that, when they are clamped axially, the said cover 14 is capable of providing them with an axial support, directly or indirectly, according to the arrangement which are described later.

In addition, the brake discs 44 and the insert discs 46 extend axially between, on the one hand, a pressure plate 50 which is subordinate to the control unit 45, and which is therefore mounted to move axially, and, on the other hand, a bearing plate 51 which is also mounted to move axially itself and which is capable of bearing axially on the cover 14.

In the embodiment shown in FIGS. 1 and 2, there are provided for this purpose small columns 52, called here for convenience small transmission columns, which extend axially in the direction of the cover 14 reckoning from the bearing plate 51 and which, after passing through the pinion-carrier 25 and, more precisely, the shafts 24 and the arms 30 comprised axially in this pinion-carrier 25, are capable of bearing axially on the cover 14. In this embodiment, these small transmission columns 52 bear directly on the cover 14, as shown.

As a corollary, in this embodiment, the bearing plate 51 has, at its outer periphery, a rim 53 which extends axially in the direction of the cover 14, and by which it is centered on the pinion-carrier 25. The bearing plate 51 is additionally locked in rotation on this pinion-carrier 25, which facilitates the transfer of the torque to which is is subjected.

For this purpose, in the embodiment shown, its axial rim 53 has locally at least one notch 96 through which it is engaged axially on a stud 97, or any other projection of this type, carried radially for this purpose by the pinion-carrier 25 in projection on the section of its transversal flange 28.

In practice, to minimise the axial bulk of the assembly, the pressure plate 50 is engaged by openings 91 on the heads of screws 48. In the embodiments shown, the unit 45 for controlling the brake 21 is arranged as a ring inside the inner bore of the stub 11 between the latter and the associated wheel shaft. To constitute a service brake, this control unit 45 comprises a hydraulic control.

The latter in practice consists of a piston 55, or service piston, which bears axially on the pressure plate 50 and whose cylinder 56 is capable of being connected, through channels inside the stub 11, to a source of fluid under pressure; these arrangements are not part of the present invention and will not be described in greater detail here.

The control unit 45 additionally comprises, to constitute an emergency brake or parking brake, a second piston 60, or emergency or parking piston, which, subordinate to a stack of Belleville washers 61, is capable of actuating, by means of a shoulder 63, the service piston 55, and whose cylinder 62 is normally connected, through channels inside the stub 11 and according to arrangements which will not be described in greater detail here, to a source of fluid under pressure, separate from the preceding one, to ensure its retention.

An annular partition 99, locked axially on the stub, in both directions, in the embodiment shown, by two elastic split washers 98 engaged with grooves provided for this purpose in this stub 11, separates from each other the cylinder 56 of the service piston 55, and that 62 of the emergency or parking piston 60.

In the embodiment shown, the cylinder 56 of the service piston 55 is formed between the inner bore of the stub 11 and an axial extension of the emergency or parking cylinder 60, and a spring 84 which bears axially on the end of the said axial extension, stresses permanently the said service piston 55 in the direction opposite to the cover 14, to unclamp the brake discs 44 and the insert discs 46 between two braking actions.

The mechanical control formed by the Belleville washers 61 is arranged so as to make it possible to ensure a clamping of these discs, the said Belleville washers 61, which for this purpose act on the emergency or parking piston 60, bearing on a shoulder 78 of the stub 11 which is turned towards the cover 14.

In operation, the cylinder 62 of the emergency or parking piston 60 is normally under pressure. For braking in a parking mode it is set at release. The Belleville washers 61 then push this emergency or parking piston 60 in the direction of the cover 14, and the latter, through the intermediary of the service cylinder 55 and of the pressure plate 50, ensures a clamping of the brake discs 44 and the insert discs 38 against the bearing plate 51, the latter being itself counter-supported by the cover 14 through the intermediary of the small transmission columns 52.

This is also the case if, in operation, any defect causes the setting to release of the cylinder 62 of the emergency or parking piston 60.

In this case, to ensure manual unclamping of the brake discs 44 and the insert discs 46, it suffices, in the embodiment shown in FIGS. 1 and 2, to act by unscrewing the screws forming the axial ties 75 which attach the cover 14 to the pinion-carrier 25.

In fact, during this unscrewing, the cover 14, by moving back, progressively permits a corresponding backward movement of the small transmission columns 52 and of the bearing plate 51, under the stress of the Belleville washers 61 which, in a first stage, are still free to exert their effects. However, in a second stage, the emergency or parking piston 60 through which they display their effects in this way, comes to bear axially on abutment means provided for this purpose in its travel. In the embodiment shown, this is the elastic split washer 98 which is nearest to the Belleville washers 61, and the emergency or parking piston 60 comes to about against it with a transverse shoulder 100.

As soon as the emergency or parking piston 60 is thus in axial abutment against this elastic split washer 98, the Belleville washers 61 have no further effect.

As the unscrewing of the screws forming the axial ties 75 continues, the corresponding backward motion of the cover 14, of the small transmission columns 52 and of the bearing plate 51 ensures the required unclamping of the brake discs 44 and of the insert discs 46, these discs no longer being subjected to any stressing by the pressure plate 50 facing them.

According to an alternative form of embodiment which is not shown, each of the small transmission columns 52 bears individually on bearing screws engaged by screwing in the tapped bores provided for this purpose in the cover 14.

In such a case, to unclamp the brake discs 44 and the insert discs 46 manually, it suffices to ensure sufficient unscrewing of these bearing screws in order that, as before, the resulting backward movement of the small transmission columns 52 and of the bearing plate 51 permits the required unclamping.

According to the form of embodiment illustrated in FIG. 3, a bearing plate 51' bears axially on the pinion shaft 37 of the reducer 20, while bearing, with the section 101 of its hub 102, on the corresponding section of the grooves 104 which this pinion shaft 37 has for its meshing with the planetary pinions 23, and, jointly, the said pinion shaft 37 bears, at its opposite end, axially against the cover 14.

In the embodiment shown, this axial bearing is produced indirectly, through the intermediary of a thrust bearing 105 and of an elastic washer with axial action 106 stressing permanently the said thrust bearing, and hence the pinion shaft 37, in an opposite direction to the cover 14, to take up possible play.

It follows, nevertheless, that the pinion shaft 37 could bear axially directly against the cover 14.

In all cases, the counter-support of the brake discs 44 and of the insert discs 46 is produced advantageously above all in consequence of a circularly continuous bearing action of the bearing plate which is free from a point support on the small columns, the only scope for distortion of the plate being a possible slight conical distortion.

Also in all cases, the axial pressure to which the pinion shaft 37 is unavoidably subjected in service is advantageously taken up in well-defined conditions.

Whatever the situation, to unclamp manually the brake discs 44 and the insert discs 46 it suffices, as for the embodiment shown in FIGS. 1 and 2, to ensure the unscrewing of the screws forming the axial ties 75 attaching the cover 14 to the pinion-carrier 25.

It will be appreciated that, in all cases, the backward movement of the cover 14 which is required for this manual unclamping is incapable of resulting in any contamination of the inner space of the hollow body 10, the latter being closed transversely by the flange 27 of the pinion-carrier 25 immediately before the said cover 14, and that it is this pinion-carrier 25 which itself ensures the axial support of this cover 14.

Furthermore, in the embodiment shown in FIG. 3, the spring 84 to which the service piston 55 is subordinated bears on the hub 47 carrying the brake discs 44, and the latter is centred by the emergency or parking piston 60.

Finally, in this embodiment, the bearing plate 51' is locked in rotation, and centered, on the pinion shaft 37, a grooved fitting being provided between the latter and its hub 102; in an alternative form, it can be fitted idle on the pinion shaft 37.

Whatever the situation, having no longer to center nor to drive the bearing plate 51', the pinion-carrier 25 can advantageously be standard pinion-carrier, that is to say a pinion carrier of the type of those employed, for example, in the wheel hubs with an integrated reducer and not incorporating a brake.

The present invention is, furthermore, not limited to the embodiments described and shown, but covers any alternative form of embodiment and/or of combination of their various elements.

I claim:

1. A wheel hub assembly with a disc brake and gear reduction mechanism, said wheel hub assembly comprising a fixed hollow stub support, a generally tubular hollow body mounted for rotation on said fixed hollow stub support, a removable cover normally closing off one end of said hollow body axially remote from said fixed hollow stub support, means for mounting a wheel provided on the outside of said hollow body, means for removably securing said cover to said hollow body independent of said means for mounting a wheel, a wheel shaft rotatable inside of said fixed hollow stub support, said disc brake comprising at least one brake disc fixed for rotation with said wheel shaft, a control unit remote from said cover relative to said brake disc for applying a clamping force to said brake disc, means for transmitting said clamping force from said brake disc to said cover so that said cover acts as a bearing support, said reduction gear mechanism also being disposed inside said hollow body and including a pinion carrier fixed for rotation with said hollow body, said pinion carrier being a part formed separate from said cover and said hollow body, axial abutment means for said pinion carrier fixed on said hollow body, said pinion carrier being disposed immediately inwardly of said cover, said means removably securing said cover being adapted to be loosened for unclamping said brake disc, said pinion carrier defining means for preventing contamination of the interior of said hollow body upon loosening or removing of said cover for unclamping said brake disc.

2. A wheel hub assembly according to claim 1, wherein said means for transmitting said clamping force comprises on the side of said brake disc axially remote from said control unit a bearing plate associated with said brake disc and transmission columns extending axially through said pinion carrier between said cover and said bearing plate for bearing axially against said cover.

3. A wheel hub assembly according to claim 2, wherein said transmission columns are engageable directly with said cover, so that upon loosening said means for removably securing said cover said disc brake is released.

4. A wheel hub assembly according to claim 3, wherein said means for removably securing said cover comprises threaded fasteners sealingly extending through said cover and threadedly engaged in said pinion carrier.

5. A wheel hub assembly according to claim 2, wherein said bearing plate has an axially extending outer peripheral rim for centering said bearing plate on said pinion carrier.

6. A wheel hub assembly according to claim 5, wherein said peripheral rim of said bearing plate has at least one notch axially engaged with a radially outward projection on said pinion carrier.

7. A wheel hub assembly according to claim 2, wherein said bearing plate is fixed to said pinion carrier for rotation with said pinion carrier.

8. A wheel hub assembly according to claim 2, wherein said hollow body has in axial section an internal step cooperable with a radial collar formed along the periphery of said cover.

9. A wheel hub assembly according to claim 1, wherein said means for transmitting said clamping force to said cover comprises a bearing plate on the side of said brake disc axially remote from said control unit associated with said disc brake, said gear reduction mechanism having a pinion shaft bearing axially against said cover, said bearing plate bearing axially against said pinion shaft so that said brake disc indirectly bears against said cover.

10. A wheel hub assembly according to claim 1, wherein said abutment means comprises a resilient lock washer, received in an internal groove in said hollow body.

11. A wheel hub assembly according to claim 10, wherein said cover extends axially into the vicinity of said lock washer.

12. A wheel hub assembly according to claim 1, wherein said pinion carrier itself axially supports said cover.

13. A wheel hub assembly according to claim 1, wherein said brake disc is fixed for rotation with a carrier hub, said carrier hub being fixed for rotation with a pinion shaft of said reduction gear, said carrier hub being adapted to be fixed for rotation with said wheel shaft so that said carrier hub defines a connection between said wheel shaft and said pinion shaft.

14. A wheel hub assembly according to claim 1, wherein said disc brake comprises a plurality of said brake discs alternating with insert discs, said inserts discs being received on an axial supporting column, said gear reduction mechanism further comprises a ring gear fixed against rotation with said fixed stub shaft, said ring gear meshing with planetary gears carried by said pinion carrier, and said axial supporting column being supported by said ring gear.

* * * * *